Patented Aug. 30, 1927.

1,640,544

UNITED STATES PATENT OFFICE.

WILLIAM T. HEADLEY, OF PHILADELPHIA, PENNSYLVANIA.

SOAPY EMULSION OF BITUMEN SUITABLE FOR PAVING AND METHOD OF MAKING THE SAME.

No Drawing.     Application filed August 5, 1926. Serial No. 127,489.

The principal object of the present invention is to provide soapy emulsions of bitumen suitable for paving purposes and which will withstand exposure to temperatures below zero F. without breaking the emulsion. Another object of the invention is to provide soapy emulsions of bitumen suitable for paving which may remain in barrels or containers exposed to atmospheric conditions during the winter and which when thawed will be ready for use, or in other words, to remove the manufacture and use of soapy emulsions of bitumen suitable for paving from a seasonal to an all the year business.

Those skilled in the art are familiar with soapy emulsions of bitumen suitable for paving and are acquainted with the fact that the character and quantity of bitumen supplied depends upon the character of the ultimate paving or other use.

For different uses it is necessary, desirable or customary to provide bitumen or asphalt of different penetration or hardness, some roads or uses require harder and some softer bitumen. This is well known to those skilled in the art. The proportion of bitumen to soap or soapy emulsifying agent also may vary for different uses and the element of waste of soap is an item for consideration. These matters of proportion have long been understood by those skilled in the art. However, by way of explanation and not limitation, for road work the following example may be given: 65% by weight of asphalt; 4% to 6% by weight of soap; and 30% by weight of water, more or less. The soapy emulsifying agent may, for example, be a soap compounded with 18% to 20% by weight of alkali, as caustic potash, and 80% by weight of fatty acid such as soya bean oil, linseed oil and the like in the presence of the necessary water. One way of making the emulsion is to first prepare the soapy emulsifying agent, and then stirring in the asphalt after which the necessary amount of water is added to give the required fluidity.

I have discovered, although I do not know the philosophy of it, that if the fatty acid or oil of any kind suitable for the purpose, for instance a drying oil, be subjected to a high degree of heat from 400 to 600° F. more or less, for two hours, more or less, and combined with alkali to form a soap at a lower temperature, or if the fatty acid or oil after the introduction of the alkali be subjected to a high degree of heat from 400 to 600° F. more or less, for two hours, more or less, the character of the finished emulsion is profoundly changed, surprising and unexpected results are attained, and the industry greatly benefited. The finished emulsion will not be injured by and will remain useful after exposure in barrels, tanks or containers to winter weather, and it may be said that the higher the degree of heat employed, within substantially the limits given, the colder the weather that the product is capable of withstanding without losing its character as a soapy emulsion of bitumen or asphalt suitable for paving.

In the description and claims the term "suitable for paving purposes" is used descriptively of qualities, such as penetration and the like, of the bitumen or asphalt and is not intended to limit the use of the emulsion to paving purposes or to any other purposes to which it is suitable such, for example, as paint.

In the claims and in the preceding description the term oils is used synonymously with the term fatty acids. Resin and resinols have been used to compound bituminous emulsions, but I do not intend to include these substances within the term "fatty acid" or to claim the same because they are not true fatty acids and because by their use in accordance with this invention, there is produced a soapy emulsion of bitumen which while suitable for paving purposes will not maintain its emulsified form after exposure to temperatures of substantially zero F. or lower.

It will be obvious to those skilled in the art to which the invention relates that modifications may be made in details of procedure and in matters of mere form without departing from the spirit of the invention which is not limited as to those matters or otherwise than as the prior art and the appended claims may require.

I claim:

1. In the manufacture of soapy emulsions of asphalt in water the improvement which consists in subjecting the saponifiable base of the soap to a temperature substantially from 400° to 600° F. prior to its saponification and use as an emulsifying agent.

2. An aqueous bituminous emulsion, suitable for paving purposes and capable of withstanding exposures to temperatures below zero F. without breaking, containing a soapy emulsifying agent which has been subjected to a heating of from 400° to 600° F. at any stage of its preparation.

3. As a new composition of matter bitumen suitable for paving purposes emulsified in water with a soapy agent, said soapy agent, during its manufacture and prior to its use as an emulsifying agent, having been subjected to a high temperature to make the composition capable of maintaining its emulsified form, upon exposure to temperature of substantially zero F. or lower.

WILLIAM T. HEADLEY.